(12) United States Patent
Bhandari et al.

(10) Patent No.: US 11,262,989 B2
(45) Date of Patent: Mar. 1, 2022

(54) AUTOMATIC GENERATION OF EFFICIENT VECTOR CODE WITH LOW OVERHEAD IN A TIME-EFFICIENT MANNER INDEPENDENT OF VECTOR WIDTH

(71) Applicant: Advanced Micro Devices, Inc., Santa Clara, CA (US)

(72) Inventors: Abhilash Bhandari, Bangalore (IN); Venugopal Raghavan, Bangalore (IN); Mohammad Asghar Ahmad Shahid, Bangalore (IN); Anupama Rajesh Rasale, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 97 days.

(21) Appl. No.: 16/663,107

(22) Filed: Oct. 24, 2019

(65) Prior Publication Data

US 2021/0042099 A1     Feb. 11, 2021

(30) Foreign Application Priority Data

Aug. 5, 2019   (IN) .............................. 201911031587

(51) Int. Cl.
*G06F 9/44*     (2018.01)
*G06F 8/41*     (2018.01)
(Continued)

(52) U.S. Cl.
CPC ............... *G06F 8/433* (2013.01); *G06F 8/30* (2013.01); *G06F 8/441* (2013.01); *G06F 9/30036* (2013.01); *G06F 9/30123* (2013.01)

(58) Field of Classification Search
CPC . G06F 8/30; G06F 8/433; G06F 8/441; G06F 9/30036; G06F 9/30123
(Continued)

(56) References Cited

U.S. PATENT DOCUMENTS 5,491,823 A * 2/1996 Ruttenberg ............. G06F 8/452
                                                        717/161
5,805,462 A * 9/1998 Poirot ..................... G06F 30/30
                                                        716/103
(Continued)

OTHER PUBLICATIONS

Eshaghian et al., "Resource estimation for heterogeneous computing", 1997, Future Generation Computer Systems (FGCS), pp. 505-520. (Year: 1997).*
(Continued)

*Primary Examiner* — Ted T. Vo
(74) *Attorney, Agent, or Firm* — Liang & Cheng, PC

(57) ABSTRACT

A computing system includes a compatibility graph builder to generate a compatibility graph based on a dependency graph representing program source code, where the compatibility graph indicates compatibility relationships between operations represented in the dependency graph, a clique generator coupled with the compatibility graph builder to generate a set of candidate vector packings based on the compatibility relationships indicated in the compatibility graph, a set cover generator coupled with the clique generator to select a subset of vector packings from the set of candidate vector packings, and a vector code generator coupled with the set cover generator to generate the vector code based on the selected subset of vector packings.

20 Claims, 9 Drawing Sheets

(51) Int. Cl.
*G06F 8/30* (2018.01)
*G06F 9/30* (2018.01)

(58) Field of Classification Search
USPC .................. 717/106–108, 136–137, 140–144
See application file for complete search history.

(56) References Cited

U.S. PATENT DOCUMENTS

| | | | |
|---|---|---|---|
| 6,421,809 B1 * | 7/2002 | Wuytack | G06F 8/433 716/132 |
| 6,449,747 B2 * | 9/2002 | Wuytack | G06F 8/433 716/135 |
| 8,893,095 B2 * | 11/2014 | Gschwind | G06F 8/447 717/140 |

OTHER PUBLICATIONS

Papakonstantinou, "High-level automation of custom hardware design for high-performance computing", 2012, Ph.D. Thesis, University of Illinois at Urbana-Champaign, 134 pages. (Year: 2012).*
Eshaghian et al., "Mapping Heterogeneous Task Graphs onto Heterogeneous System Graphs", 1997, IEEE, pp. 147-160 (Year: 1997).*
Hamzeh, "Compiler and Architecture Design for Coarse-Grained Programmable Accelerators", 2015, Ph.D.Thesis, Arizona State University, 162 pages. (Year: 2015).*
Barik, R., Zhao, J., & Sarkar, V. (Dec. 2010). Efficient selection of vector instructions using dynamic programming. In Proceedings of the 2010 43rd Annual IEEE/ACM International Symposium on Microarchitecture (pp. 201-212). IEEE Computer Society.
Das, Dibyendu & Chakraborty, Soham & Lai, Michael. (2013). Experience with Partial Simdization in Open64 Compiler Using Dynamic Programming.

* cited by examiner

AUTOMATIC GENERATION OF EFFICIENT VECTOR CODE WITH LOW OVERHEAD IN A TIME-EFFICIENT MANNER INDEPENDENT OF VECTOR WIDTH

RELATED APPLICATIONS

This application claims priority to Indian Provisional Application No. 201911031587, filed on Aug. 5, 2019, which is incorporated by reference herein in its entirety.

BACKGROUND

Many types of modern microprocessors support Single Instruction Multiple Data (SIMD) instructions. SIMD instructions enable microprocessors to exploit data level parallelism. Specifically, a SIMD instruction performs the same identical action simultaneously on two or more pieces of data. There are different ways to utilize the SIMD capabilities of a microprocessor. For example, a programmer can write SIMD assembly language instructions. Alternatively, a compiler can perform autovectorization. Autovectorization is a compiler transformation that automatically generates SIMD instructions for a program loop or a sequentially executing block of instructions. Vectorization of a program allows performance speedup of the application by leveraging the SIMD capabilities of modern microprocessors.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Modern computing systems employ processing units (e.g., central processing units (CPUs) and graphics processing units (GPUs)) that support the execution of SIMD instructions. In such a computing system, vectorization exploits the SIMD feature of the hardware to perform operations in parallel. A single vector operation works on blocks of consecutive data thus taking less time to complete the task. Vectorization is especially efficient when the data being operated upon is in a sequence such as an array.

Since writing vector code is cumbersome for a developer, a compiler performs automatic vectorization of code in loops (e.g., via Automatic Loop Vectorization) or straight-line code (e.g., via Superword Level Parallelism (SLP)). In one embodiment, a compiler receives program source code and generates SIMD instructions that can be used to efficiently execute multiple operations in parallel. The compiler performs an automatic vectorization process in which scalar code in the program source code is converted into vector code by the grouping of similar operations together.

Figure 1:
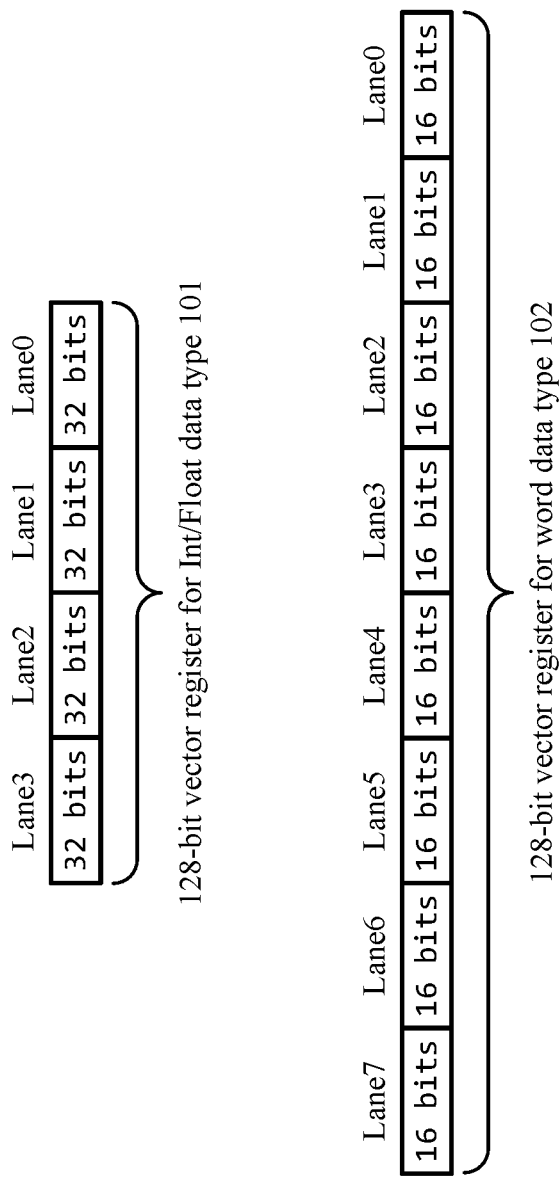
FIG. 1 illustrates multiple lanes in vector registers, according to an embodiment.

FIG. 1 illustrates a 128-bit vector register 101 for integer or float data types and a 128-bit vector register 102 for a word data type that are available in a system for performing vectorized operations in parallel. In each vector register, a lane (e.g., Lane0, Lane1, Lane2, etc.) is a unit on which operations are performed. Vector operations (e.g., VADD, VSUB, VMUL, VDIV, VRSQRTPS) operate on all lanes of a vector register. For example, the VPADDD instruction performs vector addition of values in 4 lanes having 32 bits each, and the VPSADBW instruction calculates differences between values in 16 lanes having 8-bits each.

The vectorized operations are executable using the SIMD features of a target processor for which the code is compiled. During the vectorization process, the compiler determines how to pack the vector registers to be used for the parallel operations (i.e., which vector registers will store the various operands on which the parallel operations will be performed). Automatic vectorization performed using the SLP technique typically begins vectorization only from store instructions (although there are a few extensions which start from instructions other than stores), and also generates only one set of vector packings, which may not be optimal.

Finding the optimal collection of vector packings is a combinatorial optimization problem that is NP-Complete. Modern automatic vectorization approaches are unable to consider many packing choices with acceptable complexity, since increasing the search space for optimal vector packings results in an exponential increase in computation. Automatic vectorization techniques thus settle for sub-optimal performance in exchange for faster compile time.

Table 1 provides example source code from the x264_r benchmark, including multiple operations that are candidates for automatic vectorization, according to an embodiment.

TABLE 1

Example 1: x264_r benchmark

| | |
|---|---|
| 1 | for (int i = 0; i < 4; i++, pix1 += stride, pix2 += stride) { |
| 2 | int d0 = pix1[0] − pix2[0]; |
| 3 | int d1 = pix1[1] − pix2[1]; |
| 4 | int d2 = pix1[2] − pix2[2]; |
| 5 | int d3 = pix1[3] − pix2[3]; |
| 6 | int d4 = pix1[4] − pix2[4]; |
| 7 | int d5 = pix1[5] − pix2[5]; |
| 8 | int d6 = pix1[6] − pix2[6]; |
| 9 | int d7 = pix1[7] − pix2[7]; |
| 10 | int s4 = d4 << 16; |

TABLE 1-continued

Example 1: x264_r benchmark

| | |
|---|---|
| 11 | int s5 = d5 << 16; |
| 12 | int s6 = d6 << 16; |
| 13 | int s7 = d7 << 16; |
| 14 | int a0 = d0 + s4; |
| 15 | int a1 = d1 + s5; |
| 16 | int a2 = d2 + s6; |
| 17 | int a3 = d3 + s7; |
| 18 | int t0 = a0 + a1; |
| 19 | int t1 = a0 − a1; |
| 20 | int t2 = a2 + a3; |
| 21 | int t3 = a2 − a3; |
| 22 | tmp[0][0] = be = t0 + t2; |
| 23 | tmp[0][2] = b2 = t0 − t2; |
| 24 | tmp[0][1] = b1 = t1 + t3; |
| 25 | tmp[0][3] = b3 = t1 − t3; |
| 26 | } |

Table 2 shows an unrolled version of the Example 1 source code in Table 1, in which the loop is unrolled by a factor of 2, according to an embodiment. For variables that are local to an iteration, such as s4, s5, s6, s7, t0, t1, t2, t3, b0, b1, b2 and b3, a transformation called scalar expansion has been applied for illustrating the example.

TABLE 2

Example 2: x264_r benchmark (unrolled version)

| | |
|---|---|
| 1 | for (int i = 0; i < 4; i = i+2, pix1 += stride, pix2 += stride) { |
| 2 | d0[0] = pix1[0] − pix2[0]; |
| 3 | d1[0] = pix1[1] − pix2[1]; |
| 4 | d2[0] = pix1[2] − pix2[2]; |
| 5 | d3[0] = pix1[3] − pix2[3]; |
| 6 | d4[0] = pix1[4] − pix2[4]; |
| 7 | d5[0] = pix1[5] − pix2[5]; |
| 8 | d6[0] = pix1[6] − pix2[6]; |
| 9 | d7[0] = pix1[7] − pix2[7]; |
| 10 | s4[0] = d4[0] << 16; |
| 11 | s5[0] = d5[0] << 16; |
| 12 | s6[0] = d6[0] << 16; |
| 13 | s7[0] = d7[0] << 16; |
| 14 | a0[0] = d0[0] + s4[0]; |
| 15 | a1[0] = d1[0] + s5[0]; |
| 16 | a2[0] = d2[0] + s6[0]; |
| 17 | a3[0] = d3[0] + s7[0]; |
| 18 | t0[0] = a0[0] + a1[0]; |

TABLE 2-continued

Example 2: x264_r benchmark (unrolled version)

| | |
|---|---|
| 19 | t1[0] = a0[0] − a1[0]; |
| 20 | t2[0] = a2[0] + a3[0]; |
| 21 | t3[0] = a2[0] − a3[0]; |
| 22 | tmp[0][0] = b0[0] = t0[0] + t2[0]; |
| 23 | tmp[0][2] = b2[0] = t0[0] − t2[0]; |
| 24 | tmp[0][1] = b1[0] = t1[0] + t3[0]; |
| 25 | tmp[0][3] = b3[0] = t1[0] − t3[0]; |
| 26 | pix1 += stride; |
| 27 | pix2 += stride; |
| 28 | d0[1] = pix1[0] − pix2[0]; |
| 29 | d1[1] = pix1[1] − pix2[1]; |
| 30 | d2[1] = pix1[2] − pix2[2]; |
| 31 | d3[1] = pix1[3] − pix2[3]; |
| 32 | d4[1] = pix1[4] − pix2[4]; |
| 33 | d5[1] = pix1[5] − pix2[5]; |
| 34 | d6[1] = pix1[6] − pix2[6]; |
| 35 | d7[1] = pix1[7] − pix2[7]; |
| 36 | s4[1] = d4[1] << 16; |
| 37 | s5[1] = d5[1] << 16; |
| 38 | s6[1] = d6[1] << 16; |
| 39 | s7[1] = d7[1] << 16; |
| 40 | a0[1] = d0[1] + s4[1]; |
| 41 | a1[1] = d1[1] + s5[1]; |
| 42 | a2[1] = d2[1] + s6[1]; |
| 43 | a3[1] = d3[1] + s7[1]; |
| 44 | t0[1] = a0[1] + a1[1]; |
| 45 | t1[1] = a0[1] − a1[1]; |
| 46 | t2[1] = a2[1] + a3[1]; |
| 47 | t3[1] = a2[1] − a3[1]; |
| 48 | tmp[1][0] = b0[1] = t0[1] + t2[1]; |
| 49 | tmp[1][2] = b2[1] = t0[1] − t2[1]; |
| 50 | tmp[1][1] = b1[1] = t1[1] + t3[1]; |
| | tmp[1][3] = b3[1] = t1[1] − t3[1]; |
| | } |

Table 3 shows the result of automatic vectorization of the Example 1 source code, according to an embodiment. Shuffle instructions (e.g., lines 5, 6, 9, and 10) are used to reorder the elements in a vector. The shuffle instructions given here are of the form: <resultant vector>=shuffle<lane number><input vector1><input vector2>. The lanes for the input vectors <input vector1> and <input vector2> are numbered sequentially. For instance, if the input vectors have 4 lanes each, then the lanes of <input vector1> are numbered from 0 to 3 and the lanes of <input vector2> are numbered from 4-7.

TABLE 3

Vectorization of Example 1: Desired Vector Code with 128-bit registers

| | |
|---|---|
| 1 | <d0, d1, d2, d3> = <pix1[0], pix1[1], pix1[2], pix1[3]> − <pix2[0], pix2[1], pix2[2], pix2[3]>; |
| 2 | <d4, d5, d6, d7> = <pix1[4], pix1[5], pix1[6], pix1[7]> − <pix2[4], pix2[5], pix2[6], pix2[7]>; |
| 3 | <s4, s5, s6, s7> = <d4, d5, d6, d7> << <16, 16, 16, 16>; |
| 4 | <a0, a1, a2, a3> = <d0, d1, d2, d3> + <s4, s5, s6, s7>; |
| 5 | <a0, a2> = shuffle<0, 2><a0, a1, a2, a3>; |
| 6 | <a1, a3> = shuffle<1, 3><a0, a1, a2, a3>; |
| 7 | <t0, t2> = <a0, a2> + <a1, a3>; |
| 8 | <t1, t3> = <a0, a2> − <a1, a3>; |
| 9 | <t0, t1> = shuffle<0, 2><t0, t2> <t1, t3>; |
| 10 | <t2, t3> = shuffle<1, 3><t0, t2> <t1, t3>; |
| 11 | <tmp[0][0], tmp[0][1]> = <t0, t1> + <t2, t3>; |
| 12 | <tmp[0][2], tmp[0][3]> = <t0, t1> − <t2, t3>; |

The automatic vectorization of the Example 1 source code as shown in Table 3 does not fully utilize the available vector units. The elements a0, a1, a2, and a3 are 32-bit integers. Thus, the vector width should be 4 to fully utilize 128-bit vector registers (i.e., 4 elements packed together). However, the vector width is 2 due to dependencies and the parallelism available in the looped source code. More parallelism is exposed by unrolling the source code. The code in Example 2 shown in Table 2 is obtained by unrolling the loop by a factor of 2. For variables that are local to an iteration, such as s4, s5, s6, s7, t0, t1, t2, t3, b0, b1, b2 and b3, a scalar expansion is performed. Table 4 shows the result of the automatic vectorization of the Example 2 source code, according to an embodiment.

TABLE 4

Vectorization of Example 2: Desired Vector Code with 128-bit registers

1  <d0[0], d1[0], d2[0], d3[0]> = <pix1[0], pix1[1], pix1[2], pix1[3]> – <pix2[0], pix2[1], pix2[2], pix2[3]>;
2  <d4[0], d5[0], d6[0], d7[0]> = <pix1[4], pix1[5], pix1[6], pix1[7]> – <pix2[4], pix2[5], pix2[6], pix2[7]>;
3  <s4[0], s5[0], s6[0], s7[0]> = <d4[0], d5[0], d6[0], d7[0]> >> <16, 16, 16, 16>;
4  <a0[0], a1[0], a2[0], a3[0]> = <d0[0], d1[0], d2[0], d3[0]> + <s4[0], s5[0], s6[0], s7[0]>;
5  <d0[1], d1[1], d2[1], d3[1]> = <pix1[0+stride], pix1[1+stride], pix1[2+stride], pix1[3+stride]> – <pix2[0+stride], pix2[1+stride], pix2[2+stride], pix2[3+stride]>;
6  <d4[1], d5[1], d6[1], d7[1]> = <pix1[4+stride], pix1[5+stride], pix1[6+stride], pix1[7+stride]> – <pix2[4+stride], pix2[5+stride], pix2[6+stride], pix2[7+stride]>;
7  <s4[1], s5[1], s6[1], s7[1]> = <d4[1], d5[1], d6[1], d7[1]> << <16, 16, 16, 16>;
8  <a0[1], a1[1], a2[1], a3[1]> = <d0[1], d1[1], d2[1], d3[1]> + <s4[1], s5[1], s6[1], s7[1]>;
9  <a0[0], a2[0], a0[1], a2[1]> = shuffle<0, 2, 4, 6><a0[0], a1[0], a2[0], a3[0]><a0[1], a1[1], a2[1], a3[1]>;
10 <a1[0], a3[0], a1[1], a3[1]> = shuffle<1, 3, 5, 7><a0[0], a1[0], a2[0], a3[0]><a0[1], a1[1], a2[1], a3[1]>;
11 <t0[0], t2[0], t0[1], t2[1]> = <a0[0], a2[0], a0[1], a2[1]> + <a1[0], a3[0], a1[1], a3[1]>;
12 <t1[0], t3[0], t1[1], t3[1]> = <a0[0], a2[0], a0[1], a2[1]> – <a1[0], a3[0], a1[1], a3[1]>;
13 <t0[0], t0[1], t1[0], t1[1]> = shuffle<0, 2, 4, 6><t0[0], t2[0], t0[1], t2[1]><t1[0], t3[0], t1[1], t3[1]>;
14 <t2[0], t2[1], t3[0], t3[1]> = shuffle<1, 3, 5, 7><t0[0], t2[0], t0[1], t2[1]><t1[0], t3[0], t1[1], t3[1]>;
15 <b0[0], b0[1], b1[0], b1[1]> = <t0[0], t0[1], t1[0], t1[1]> + <t2[0], t2[1], t3[0], t3[1]>;
16 <b2[0], b2[1], b3[0], b3[1]> = <t0[0], t0[1], t1[0], t1[1]> – <t2[0], t2[1], t3[0], t3[1]>;
17 <b0[0], b1[0], b2[0], b3[0]> = shuffle<0, 2, 4, 6><b0[0], b0[1], b1[0], b1[1]><b2[0], b2[1], b3[0], b3[1]>;
18 <b0[1], b1[1], b2[1], b3[1]> = shuffle<1, 3, 5, 7><b0[0], b0[1], b1[0], b1[1]><b2[0], b2[1], b3[0], b3[1]>;
19 <tmp[0][0], tmp[0][1], tmp[0][2], tmp[0][3]> = <b0[0], b1[0], b2[0], b3[0]>;
20 <tmp[1][0], tmp[1][1], tmp[1][2], tmp[1][3]> = <b0[1], b1[1], b2[1], b3[1]>;

In Table 4, the vector packings <a0[0], a1[0], a2[0], a3[0]> and <a0[1], a1[1], a2[1], a3[1]> generated in lines 4 and 8 are shuffled into <a0[0], a2[0], a0[1], a2[1]> and <a1[0], a3[0], a1[1], a3[1]> for lines 11 and 12. The vector packings <t0[0], t2[0], t0[1], t2[1]> and <t1[0], t3[0], t1[1], t3[1]> are shuffled into <t0[0], t0[1], t1[0], t1[1]> and <t2[0], t2[1], t3[0], t3[1]> for lines 15 and 16. Finally, the vector packings <b0[0], b0[1], b1[0], b1[1]> and <b2[0], b2[1], b3[0], b3[1]> are shuffled into <b0[0], b1[0], b2[0], b3[0]> and <b0[1], b1[1], b2[1], b3[1]> for lines 19 and 20. Automatic vectorization techniques such as SLP are unable to rearrange the vectors and handle data shuffling in this manner.

One embodiment of an automatic vectorization process addresses the above issues by generating a set of all possible vector packings based on a dependency graph, then selecting an optimal subset of vector packings based on a greedy set cover selection mechanism. The automatic vectorization process constructs a dependency directed acyclic graph (DDAG) from the input program source code, then constructs a compatibility graph containing all possible candidates for vector packing based on the DDAG. The process generates all of the possible vector packings by identifying cliques in the compatibility graph, then performs a set cover selection mechanism to cover all of the DDAG nodes with a subset of available vector packings. Vector code is generated for the selected subset of vector packings. Performing automatic vectorization according to this process results in efficient code for processing units (e.g., CPUs and GPUs) supporting SIMD operations. The process can also be used to generate efficient code for running on multiple threads and processors.

Figure 2:
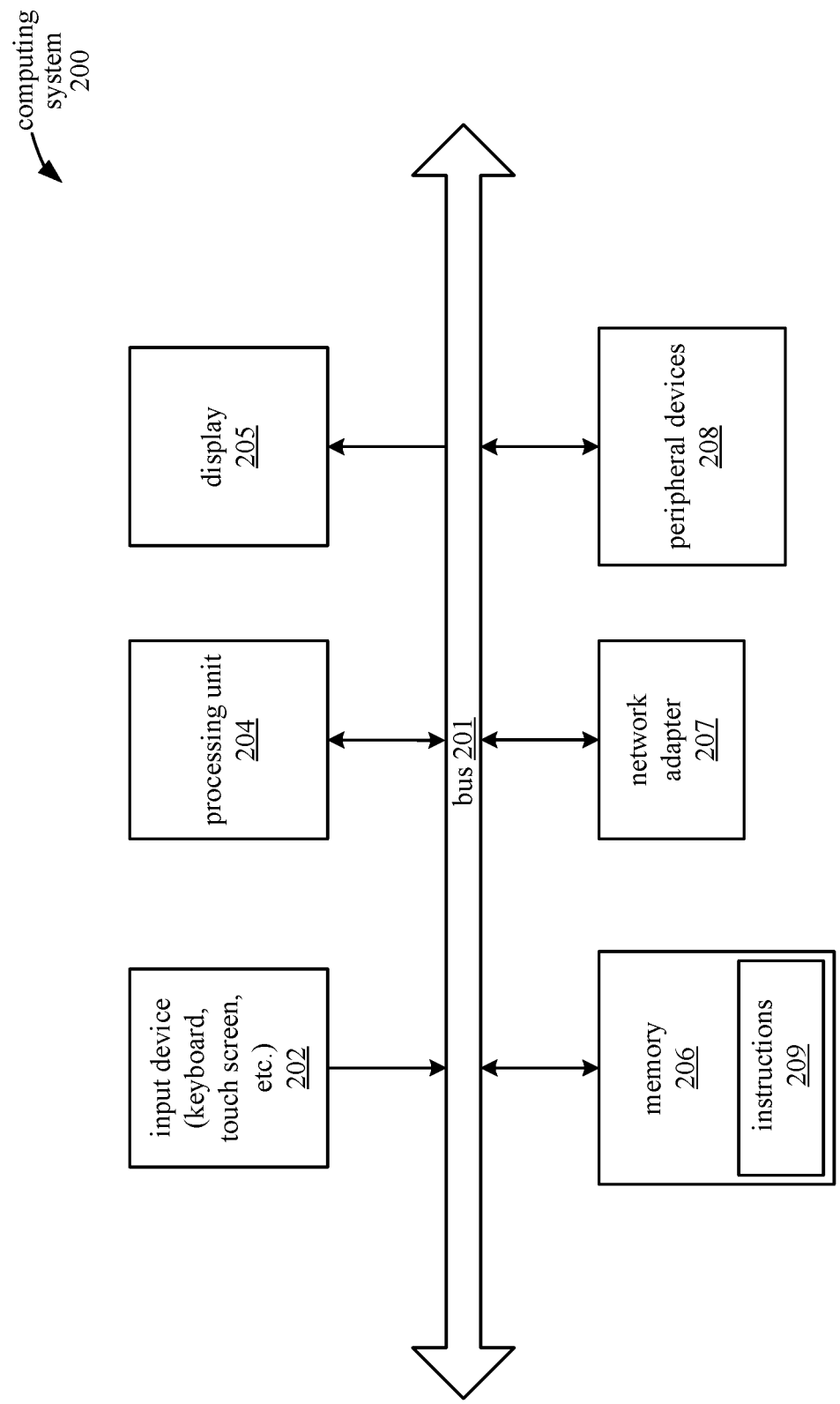
FIG. 2 illustrates a computing system, according to an embodiment.

FIG. 2 illustrates an embodiment of a computing system 200 in which automatic vectorization is performed using a DDAG and compatibility graph. In general, the computing system 200 is embodied as any of a number of different types of devices, including but not limited to a laptop or desktop computer, mobile device, server, network switch or router, etc. The computing system 200 includes a number of hardware resources, including components 202-208, which communicate with each other through a bus 201. In computing system 200, each of the components 202-208 is capable of communicating with any of the other components 202-208 either directly through the bus 201, or via one or more of the other components 202-208. The components 201-208 in computing system 200 are contained within a single physical enclosure, such as a laptop or desktop chassis, or a mobile phone casing. In alternative embodiments, some of the components of computing system 200 are embodied as external peripheral devices such that the entire computing system 200 does not reside within a single physical enclosure.

The computing system 200 also includes user interface devices for receiving information from or providing information to a user. Specifically, the computing system 200 includes an input device 202, such as a keyboard, mouse, touch-screen, or other device for receiving information from the user. The computing system 200 displays information to the user via a display 205, such as a monitor, light-emitting diode (LED) display, liquid crystal display, or other output device.

Computing system 200 additionally includes a network adapter 207 for transmitting and receiving data over a wired or wireless network. Computing system 200 also includes one or more peripheral devices 208. The peripheral devices 208 may include mass storage devices, location detection devices, sensors, input devices, or other types of devices used by the computing system 200. Memory system 206 includes memory devices used by the computing system 200, such as random-access memory (RAM) modules, read-only memory (ROM) modules, hard disks, and other non-transitory computer-readable media.

Computing system 200 includes a processing unit 204. In one embodiment, the processing unit 204 includes multiple processing cores that reside on a common integrated circuit substrate. The processing unit 204 receives and executes instructions 209 that are stored in a memory system 206. At least a portion of the instructions 209 defines a compiler program that receives program source code (e.g., for an application) and compiles the source code to generate a set of instructions for the program that are executable by the processing unit 204. The compiling process includes the automatic vectorization process utilizing a DDAG and compatibility graph to generate vector packings.

Some embodiments of computing system 200 may include fewer or more components than the embodiment as illustrated in FIG. 2. For example, certain embodiments are implemented without any display 205 or input devices 202. Other embodiments have more than one of a particular component; for example, an embodiment of computing system 200 could have multiple processing units 204, buses 201, network adapters 207, memory systems 206, etc.

Figure 3:
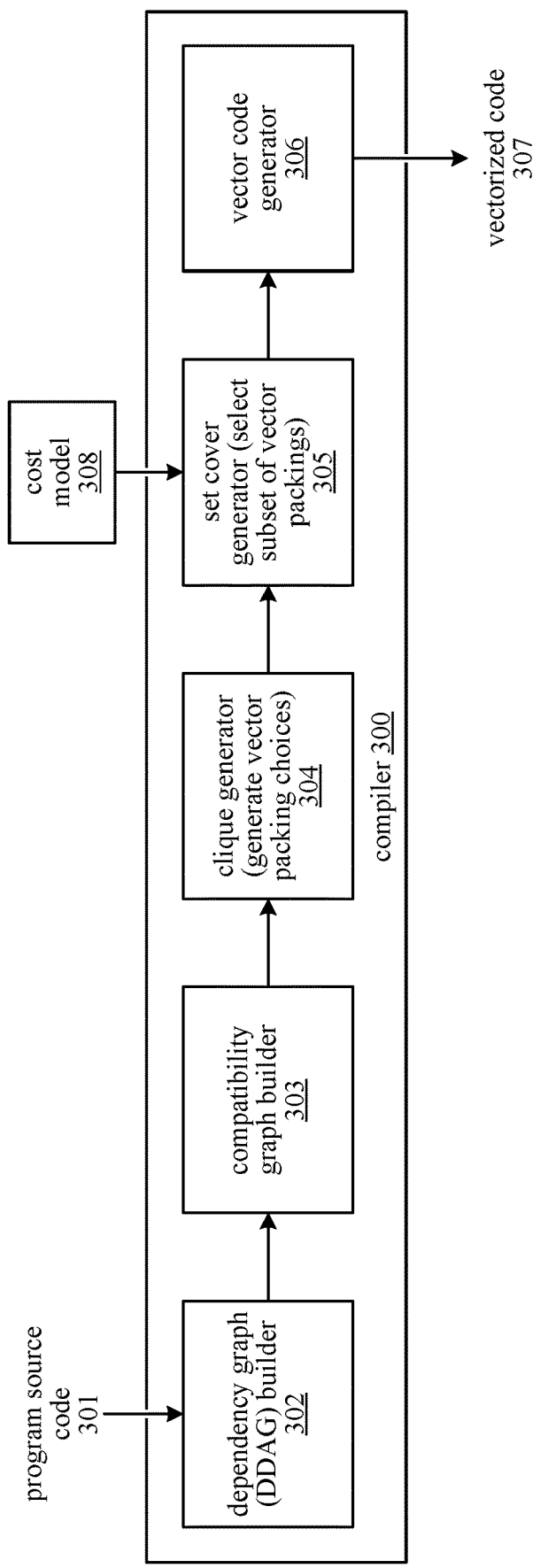
FIG. 3 illustrates components of a compiler, according to an embodiment.

FIG. 3 illustrates a block diagram for a compiler that selects vector packings based on a DDAG and compatibility graph, according to an embodiment. The components of the compiler 300 as illustrated in FIG. 3 are implemented as hardware, software, or a combination of hardware and software modules. The compiler 300 receives the program source code 301 and generates a dependency directed acyclic graph (DDAG) in the dependency graph builder 302. The compatibility graph builder 303 receives the DDAG from the dependency graph builder 302 and traverses the DDAG to construct a compatibility graph. The clique generator 304 identifies paths (for memory access operations) and cliques (for non-memory access operations) in the compatibility graph. Each path is a sequence of nodes each representing a memory access operation, in which each node in the sequence is connected to a previous node and/or a subsequent node, and no node is repeated in the sequence. Each clique is a complete subgraph in the compatibility graph, such that each node in the clique is connected to every other node in the clique. The paths and cliques represent possible vector packing choices. The set cover generator 305 selects a subset of these candidate vector packings to cover the set of nodes in the compatibility graph, with vector packing selections made iteratively based on a cost model 308 provided to the set cover generator 305. The set cover generator 305 attempts to select a subset of vector packings that maximizes coverage of the set of nodes and that includes one and only one instance of every node present in the compatibility graph. The vector code generator 306 generates executable vector code 307 (e.g., SIMD instructions) based on the selected set of vector packings. Scalar code is generated for any nodes that are not covered by the set cover generator 305.

Figure 4:
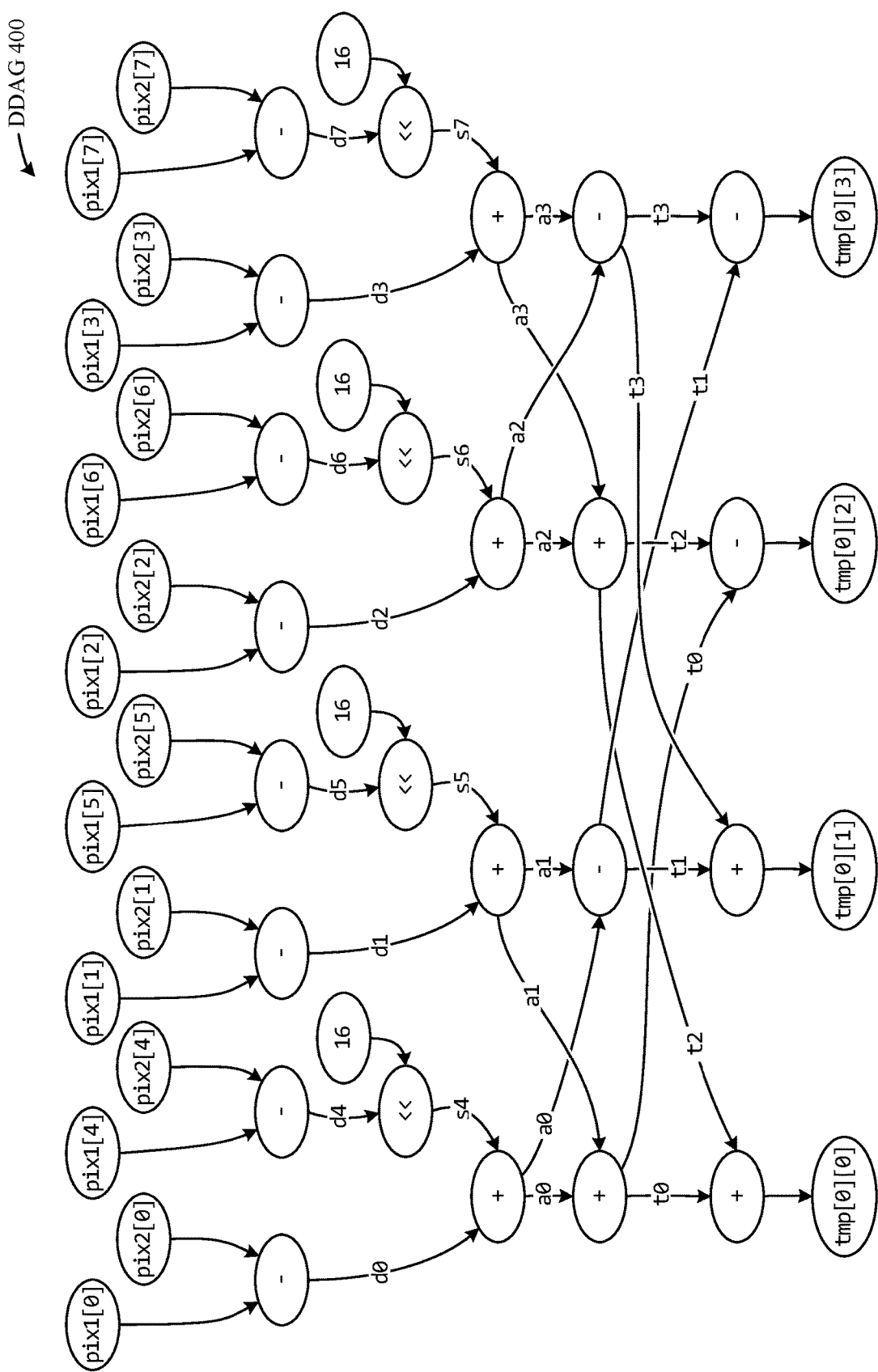
FIG. 4 illustrates a dependency directed acyclic graph (DDAG), according to an embodiment.

FIG. 4 illustrates a DDAG 400 generated by the dependency graph builder 302, according to an embodiment. The DDAG 400 represents dependencies between operations in the Example 1 source code, as shown in Table 1. Each of the nodes in the DDAG 400 represents one of the operations in the code, and each node has one or more incoming edges from other nodes on which it depends. Edges represent values generated and/or used by the operations represented by the nodes, and are labeled with their variable names (e.g., d0, d1, d2, etc.). Outgoing edges of a node represent result values of the node and incoming edges of a node represent operands of the node. In the DDAG 400, nodes labeled with variable names (e.g., pix1[0], pix2[0], etc.) or values (e.g., '16') represent memory access operations.

Figure 5A:
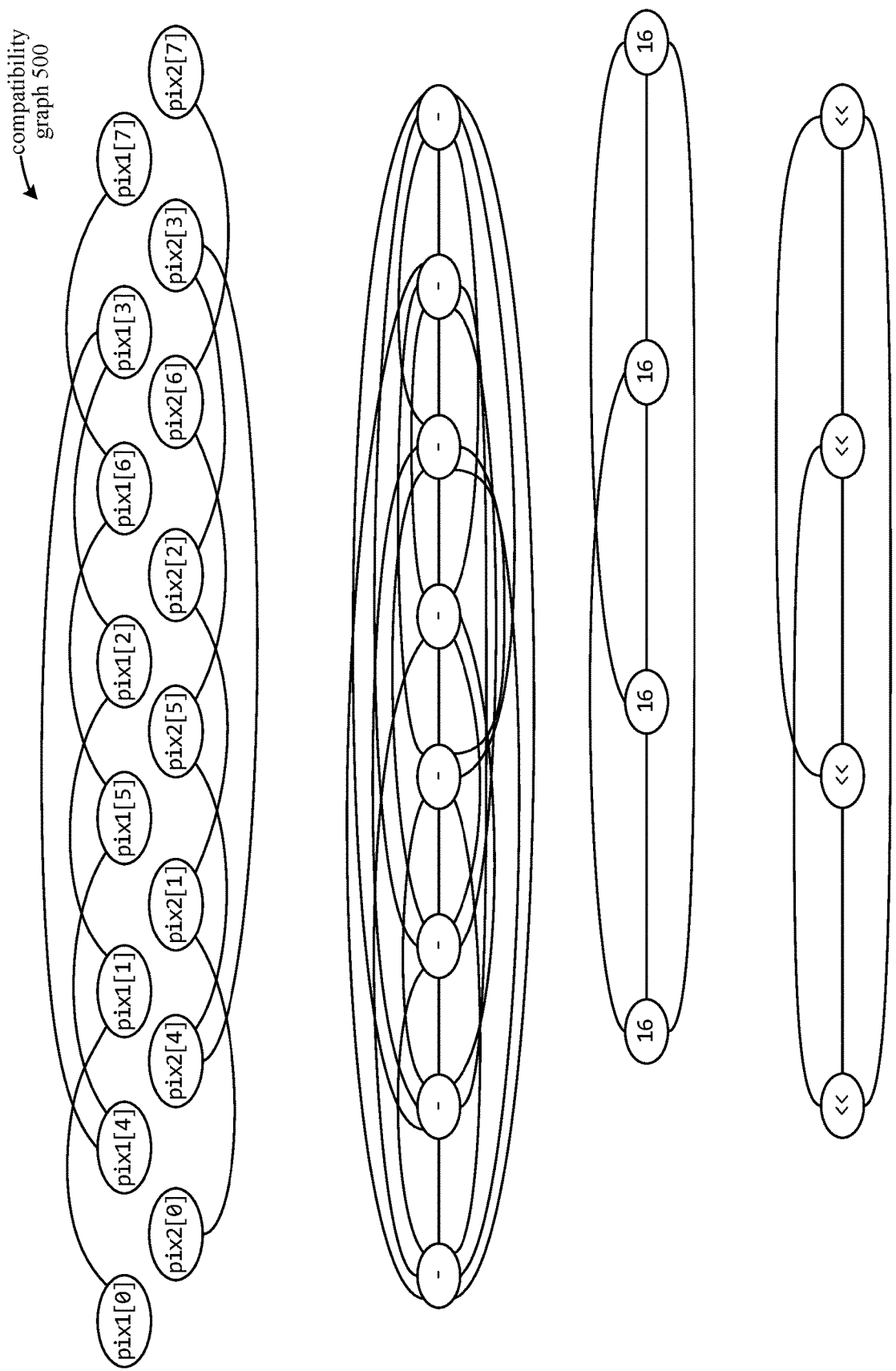
FIGS. 5A and 5B illustrate a compatibility graph, according to an embodiment.
Figure 5B:
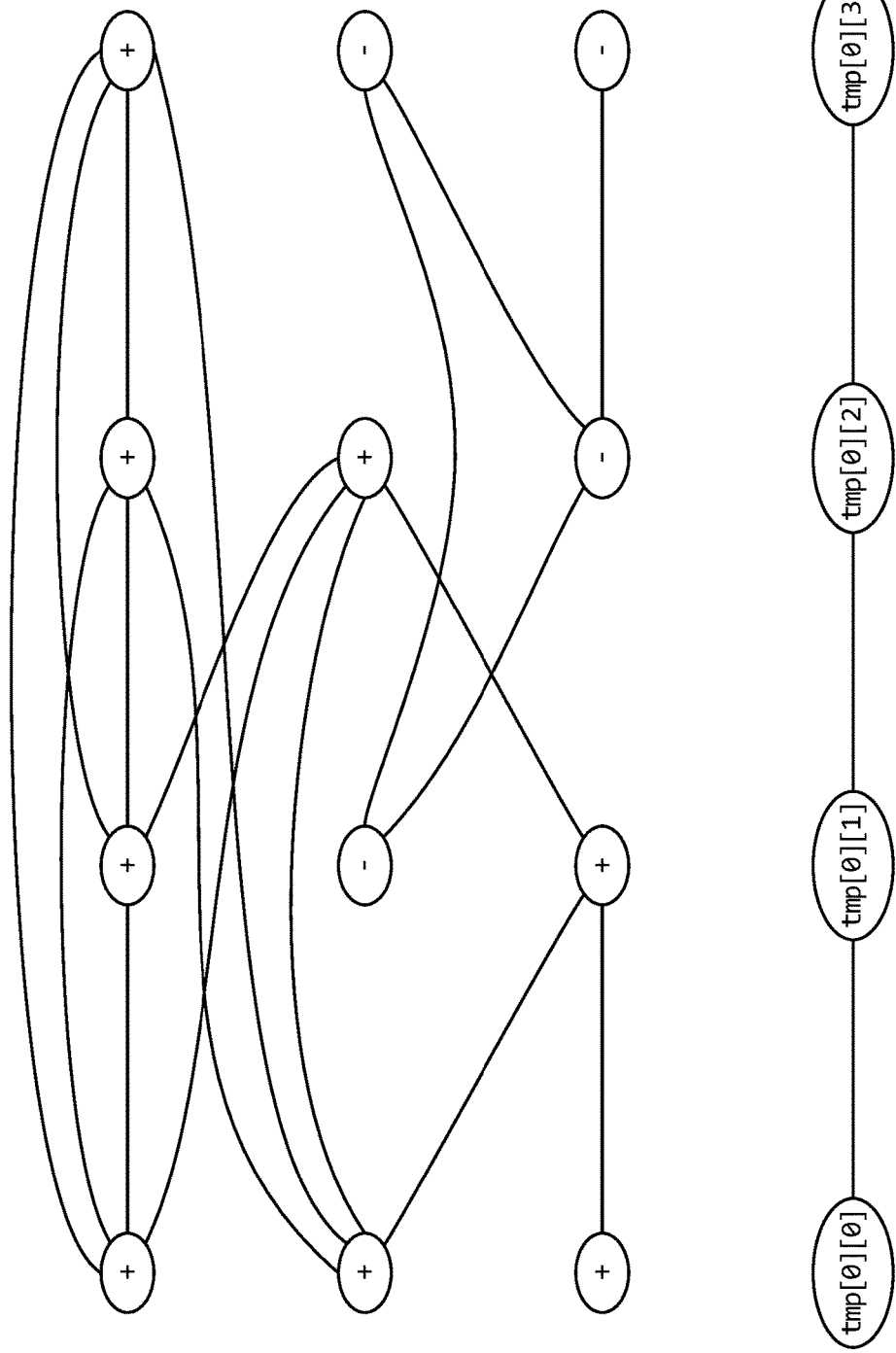

FIGS. 5A and 5B illustrate a compatibility graph 500, according to an embodiment. The compatibility graph 500 includes a node for each of the nodes in the DDAG 400. For clarity, the nodes in the compatibility graph 500 are located in similar relative positions as their corresponding nodes in the DDAG 400. Undirected edges between the nodes in the compatibility graph 500 indicate that the connected nodes are compatible. To generate the compatibility graph 500, the compatibility graph builder 303 traverses the DDAG 400. The nodes in the DDAG 400 can be traversed in any order, so long as all of the nodes are visited. When a node is visited, it is added to the compatibility graph 500 and, if it is compatible with one or more other nodes already in the graph 500, an edge is added between the newly added node and the other compatible nodes.

Two memory operations (e.g., loads and stores) are compatible with each other if they access adjacent memory locations. For other types of operations, two operations are compatible with each other if they perform the same type of operation (e.g., add, subtract, bit shift) on the same data types and are also independent from each other. That is, neither of the operations is affected by the result of the other operation.

Using the compatibility graph 500, the clique generator 304 generates multiple vector packing choices. For memory access operations, the possible vector packings are enumerated through graph traversals to determine one or more paths through the nodes representing memory access operations. In this graph traversal, edges are followed from a starting node (representing one end of the vector packing) to subsequent nodes (representing subsequent positions in the vector packing). For non-memory access operations, the vector packing choices are derived from cliques in the compatibility graph 500. Cliques in the compatibility graph 500 are identified using a clique generation process, such as the Bron-Kerbosch clique generation process. For each clique that is found, nodes in the same clique represent operations that are candidates to be vectorized together (i.e., the results of the operations are placed in consecutive lanes of the same vector register). Table 5 below lists the vector packing choices generated based on the compatibility graph 500.

TABLE 5

Vector Packing choices for Example 1 code:

| | |
|---|---|
| 1 | <pix1[0], pix1[1], pix1[2], pix1[3], pix1[4], pix1[5], pix1[6], pix1[7]> |
| 2 | <pix2[0], pix2[1], pix2[2], pix2[3], pix2[4], pix2[5], pix2[6], pix2[7]> |
| 3 | <d0, d1, d2, d3, d4, d5, d6, d7> |
| 4 | <16, 16, 16, 16> |
| 5 | <s4, s5, s6, s7> |
| 6 | <a0, a1, a2, a3> |
| 7 | <a0, t2>, <a1, t2>, <a2, t0>, <a3, t0> |
| 8 | <t0, t2>, <t1, t3> |
| 9 | <b0, b2>, <b1, b3> |
| 10 | <tmp[0][0], tmp[0][1], tmp[0][2], tmp[0][3]> |

The set cover generator 305 receives the set of candidate vector packings (e.g., as illustrated in Table 5) and selects a subset of the vector packings for generating the final vectorized code 307. A cost model 308 is provided to the set cover generator 305 and is used to predict and identify the most profitable vector packings in the set of candidate vector packings. The cost model 308 accounts for different factors such as the number of unused vector register lanes, the execution cost of certain instructions (e.g., some types of shuffle instructions incur a larger penalty for execution than other types of shuffle instructions), or other factors. Thus, the cost model 308 allows the set cover generator 305 to select vector packings that avoid the costlier types of shuffle instructions, or to avoid selecting vector packings that leave vector register lanes unused. The cost model 308 varies depending on the target system for which the program source code 301 is being compiled.

The set cover generator 305 operates iteratively to select each vector packing in the subset of vector packings for generating the final vectorized code 307. At each iteration, the set cover generator selects the most profitable vector packing from among the candidate vector packings, according to the cost model 308. Vector packings that cannot be scheduled with the already selected ones (e.g., the selection would cause a value to be present in multiple vectors) or that are costly are rejected. Each selection of a vector packing thus constrains subsequent selections. The set cover selection process terminates when all the instructions are covered or no more vector packings can be selected (i.e., the remaining unselected vector packings are not schedulable with the already selected vector packings). The selected set of vector packings is then given to the vector code generator 306 to generate the vector code 307. Table 6 below lists the subset of vector packings selected for the Example 1 code.

dependencies between the operations. An operation is dependent on a preceding operation when its result is affected by the result of the preceding operation.

At block 605, the compatibility graph builder 303 generates a compatibility graph 500 based on the DDAG 400 representing the program source code 301. The compatibility graph 500 indicates compatibility relationships between the operations represented in the DDAG 400. In one embodiment, the compatibility graph can also be extended to indicate compatibility relationships between use-def chains in a DDAG, where a use-def chain consists of a producer instruction at the start of the chain and a consumer instruction at the end of the chain, with intermediate instructions along the chain.

At block 607, the clique generator 304 generates a set of vector packing choices based on the compatibility relationships indicated in the compatibility graph 500. A vector packing choice indicates which variables (i.e., operands or results) used in the operations are stored together in a vector register, and the order in which the variables are stored. Each vector packing choice includes either memory access operations (e.g., load or store) or non-memory access operations. Non-memory access operations include arithmetic operations (e.g., add, subtract, etc.), logic operations (AND, OR, etc.), or other operations that are not memory access operations.

Memory access operations in the compatibility graph 500 are grouped into candidate vector packing choices, each representing a possible parallel memory access operation. In one embodiment, each candidate vector packing for a set of memory access operations is generated by determining a path through the nodes representing the memory access operations. The path is determined by selecting a starting node from the compatibility graph 500 that represents a

TABLE 6

| | Subset of Vector Packings selected: |
|---|---|
| 1 | <pix1[0], pix1[1], pix1[2], pix1[3], pix1[4], pix1[5], pix1[6], pix1[7]> |
| 2 | <pix2[0], pix2[1], pix2[2], pix2[3], pix2[4], pix2[5], pix2[6], pix2[7]> |
| 3 | <d0, d1, d2, d3, d4, d5, d6, d7> |
| 4 | <16, 16, 16, 16> |
| 5 | <s4, s5, s6, s7> |
| 6 | <a0, a1, a2, a3> |
| 7 | <t0, t2>, <t1, t3> |
| 8 | <b0, b2>, <b1, b3> |
| 9 | <tmp[0][0], tmp[0][1], tmp[0][2], tmp[0][3]> |

The selected vector packings are received by the vector code generator 306, which generates vector code 307. The vector code 307 includes the instructions for placing values in vector registers according to the selected vector packings and performing the operations on the values in parallel (e.g., via SIMD instructions).

Figure 6:
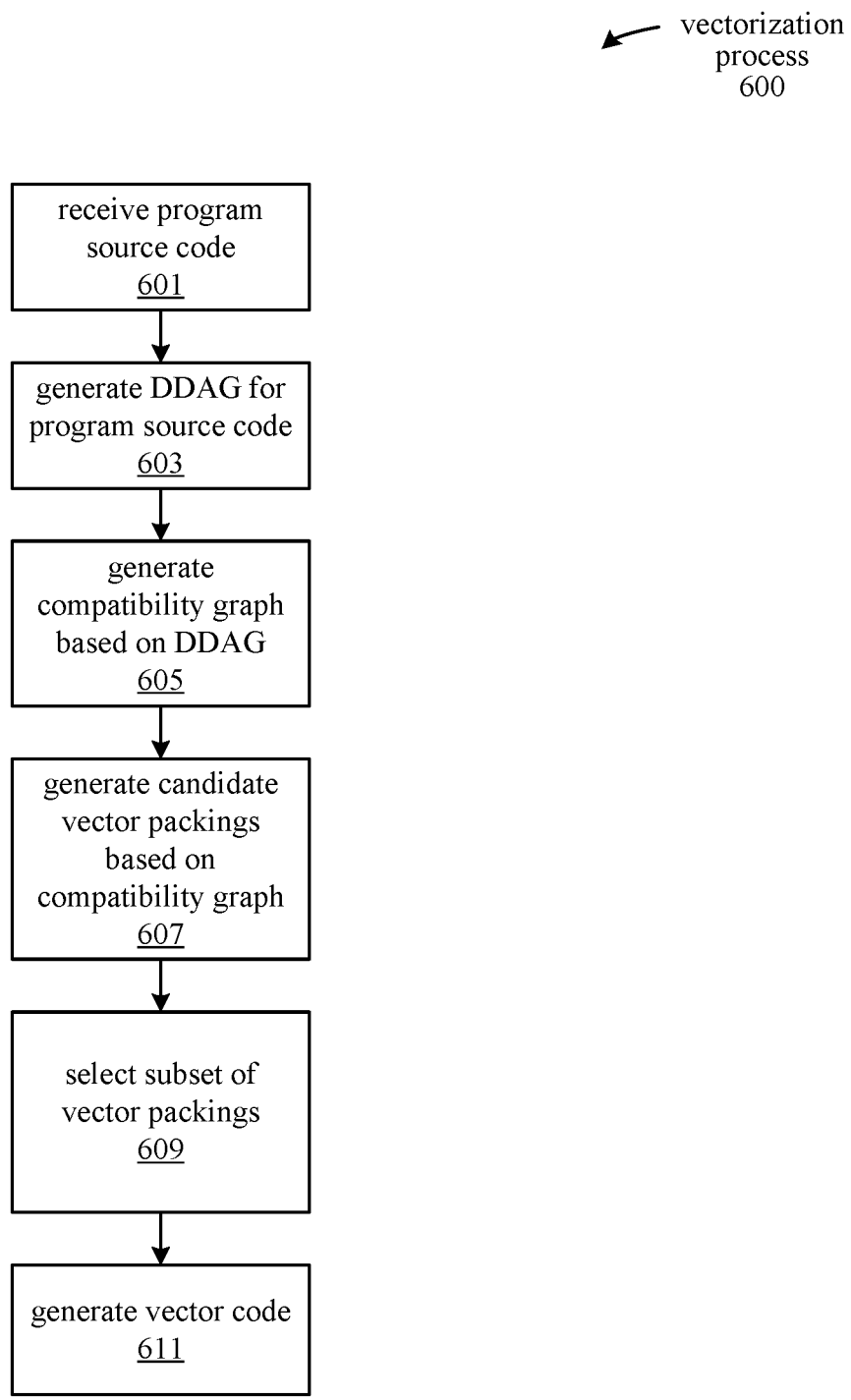
FIG. 6 is a flow diagram illustrating a process for generating vector code, according to an embodiment.

FIG. 6 is a flow diagram illustrating a process 600 for vectorizing operations in program source code, according to an embodiment. In one embodiment, the process 600 is performed by the compiler 300 implemented using components in computing system 200. In one embodiment, instructions 209 are executable by the processing unit 204 to perform the operations of the process 600.

At block 601, the compiler 300 receives the program source code 301 defining a program to be compiled. At block 603, the dependency graph builder 302 generates a DDAG 400 derived from the received program source code 301. The DDAG includes a node representing the operations defined in the program source code, and also indicates memory access operation, adding the starting node to the vector packing, then traversing the edges in the compatibility graph 500 to add subsequent nodes reachable from the starting node. The subsequent nodes represent compatible memory operations and are added to the vector packing in the order of traversal of the subsequent nodes from the starting node. As an example, multiple load operations directed to adjacent memory locations (since memory access operations directed to adjacent memory locations are compatible with each other) are grouped into a single candidate vector packing choice that represents a single parallel load operation for loading consecutive values into a vector register.

In one embodiment, each candidate vector packing for a set of non-memory access operations is generated by identifying a clique of nodes each representing a non-memory access operation in the compatibility graph 500, and adding each node of the clique to the vector packing. In one embodiment, each clique is determined by performing a Bron-Kerbosch clique generation process based on the compatibility graph 500. Alternative clique generation techniques are used in other embodiments. Each of the nodes in the clique represents an operation that is compatible with every other operation represented in the clique; thus, the candidate vector packing represents a possible vectorization of the operations into a single parallel non-memory access operation.

After all the possible candidate vector packings have been generated, the process 600 continues at block 609. At block 609, the set cover generator 305 selects a subset of the candidate vector packings by, for each of multiple iterations, selecting the most profitable vector packing according to a cost model. This most profitable vector packing is selected from among the vector packings that were not previously selected and that are schedulable with already selected vector packings. In one embodiment, the set cover generator 305 maximizes the number of nodes that are represented in the selected subset of vector packings.

At block 611, the vector code generator 306 generates vector code based on the selected subset of vector packings. For each selected vector packing in the selected subset of vector packings that represents a parallel memory operation, the vector code generator 306 generates a corresponding memory instruction for accessing a vector register according to the vector packing. The vector code generator 306 generates one or more parallel instructions (e.g., SIMD instructions) for each selected vector packing representing a set of operations that are vectorizable together into a smaller number of parallel instructions. The vector code generator 306 generates scalar instructions for operations that are not represented in any of the selected vector packings, such as operations that were only present in candidate vector packings that were not schedulable with previously selected vector packings or operations that are not compatible with any other operations.

Figure 7:
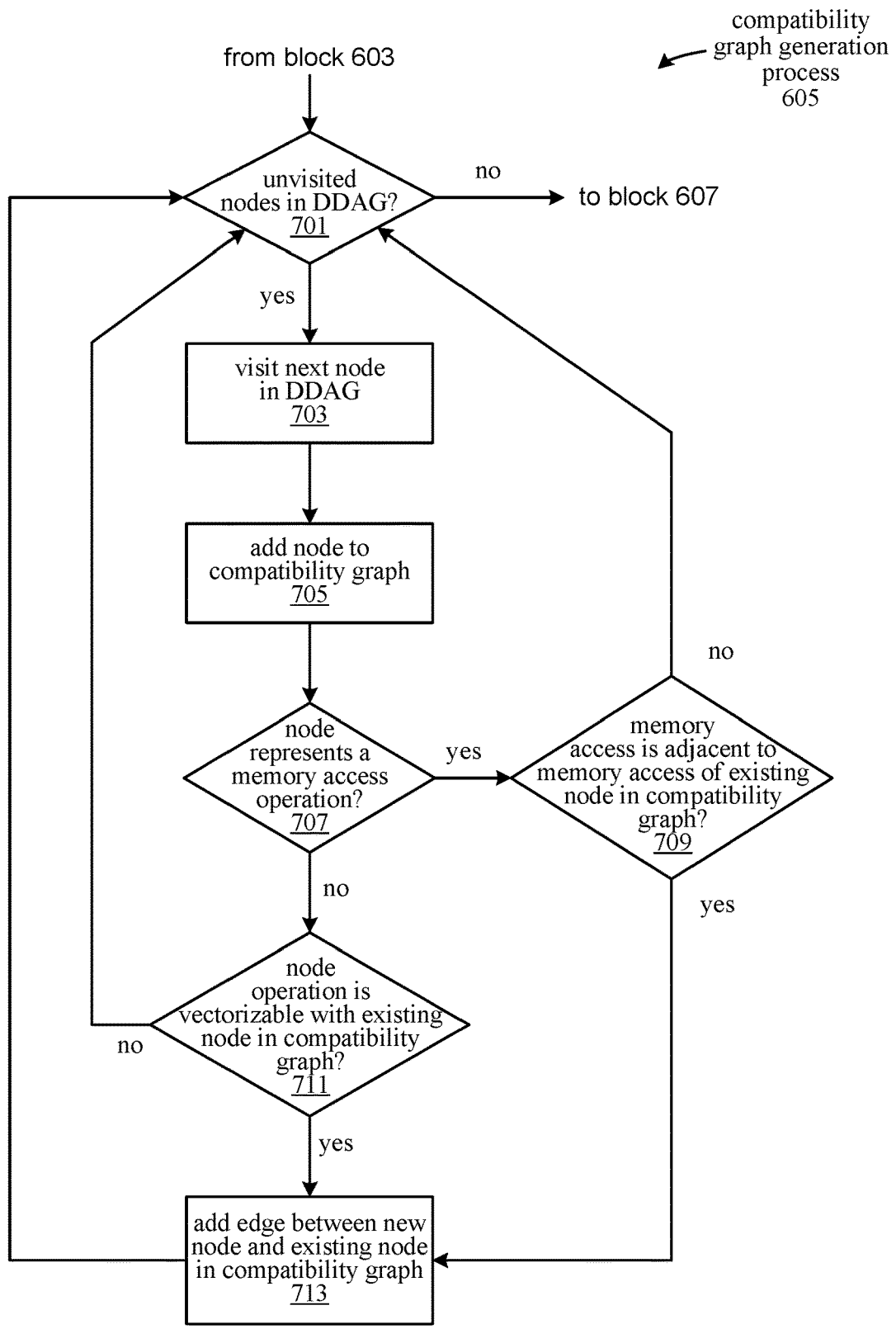
FIG. 7 is a flow diagram illustrating a process for generating a compatibility graph, according to an embodiment.

FIG. 7 illustrates the process 605 for generating the compatibility graph 500, according to an embodiment. The operations in the process 605 are performed by the compatibility graph builder 303. The compatibility graph builder 303 receives the DDAG 400 from the dependency graph builder 302 and iteratively adds each node in the DDAG 400 to the compatibility graph 500. The completed compatibility graph 500 thus includes a node for each operation that is represented in the DDAG 400.

Following block 603, the process 605 for generating the compatibility graph 500 begins at block 701. At block 701, if the DDAG 400 includes nodes that have not yet been visited, then an unvisited node in the DDAG 400 is visited as provided at block 703. In one embodiment, the nodes in the DDAG are visited in an arbitrary order. At block 703, the visited node is added to the compatibility graph 500. As each node is added, any compatibility relationships between the new node and nodes already in the compatibility graph 500 are recorded. In the compatibility graph 500, an edge is added between each pair of nodes representing operations that can be vectorized together (i.e., that are executable together in a single parallel instruction).

When the new node represents a memory access operation, as determined at block 707, the compatibility graph builder 303 determines at 709 whether the accessed memory location is adjacent to a memory location accessed by another memory access operation of the same type (e.g., load or store) that is represented by a node already in the compatibility graph 500. If so, the memory access operations are compatible and an edge is added between the nodes to record the compatibility relationship, as provided at block 713. At block 709, if the new node is not compatible with any other nodes in the compatibility graph 500, the process 605 returns to block 701 to continue visiting any remaining unvisited nodes in the DDAG 400.

At block 707, if the new node represents a non-memory access operation, the compatibility graph builder 303 determines whether the operation is vectorizable with any operation represented by an existing node already in the compatibility graph 500. In one embodiment, non-memory access operations (e.g., arithmetic operations, logic operations, etc.), are compatible if they are the same type of operation and operate on the same data type. For example, two addition operations each operating on 32-bit integer operands are compatible with each other. However, an addition operation is not compatible with a subtraction operation, and two addition operations operating on different data types (e.g., a 32-bit integer and 16-bit integer) are not compatible. At block 711, if the newly added node is compatible with an existing node in the compatibility graph, the compatibility graph builder 303 adds an edge between the nodes, as provided at block 713. At block 711, if the new node is not compatible with any other nodes in the compatibility graph 500, the process 605 returns to block 701 to continue visiting any remaining unvisited nodes in the DDAG 400.

The compatibility graph generation process 605 repeats blocks 701-713 until all of the nodes in the DDAG 400 have been visited and added to the compatibility graph 500. At this point, the compatibility graph 500 is complete and the process 605 continues to block 607. At block 607, the clique generator 304 generates the vector packing choices as previously described.

Figure 8:
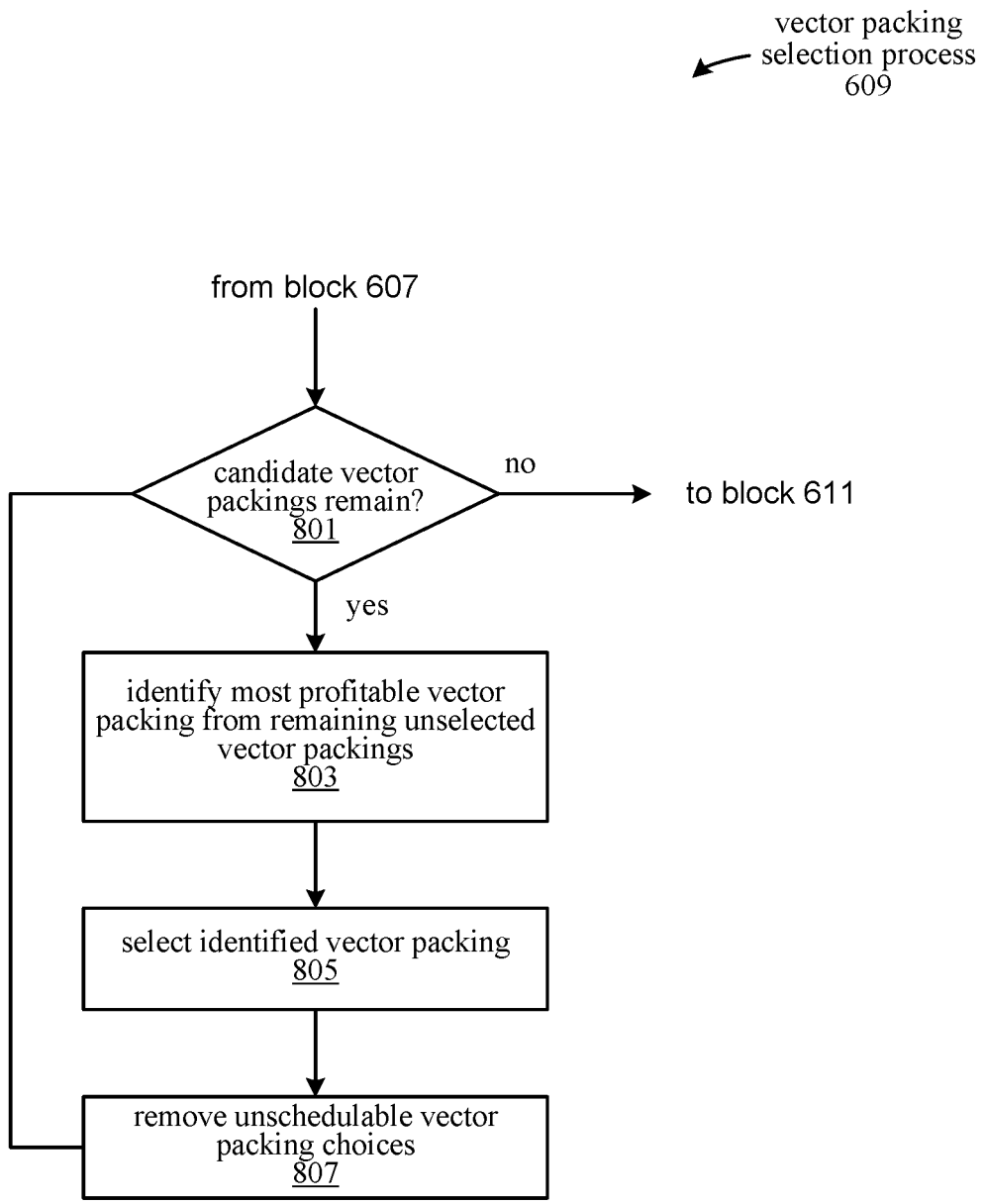
FIG. 8 is a flow diagram illustrating a process for selecting vector packing choices, according to an embodiment.

FIG. 8 illustrates the process 609 for selecting a subset of the vector packing choices generated at block 607. The process 609 is performed by the set cover generator 305 based on the vector packing choices received from the clique generator 304. FIG. 8 describes a greedy vector packing selection process. In alternative embodiments, the selection of a suitable subset of vector packings is accomplished using a Dynamic Programming Technique or a search process such as A*. Following block 607, the process 609 begins at block 801.

At block 801, if any candidate vector packings remain in the set of valid vector packing choices, process 609 continues to block 803 and identifies the most profitable vector packing from among the remaining unselected vector packing choices. In one embodiment, the profitability of a particular vector packing choice is determined based on a cost model that weighs factors such as the number of operations represented by the vector packing choice, the utilization of the vector register, etc. At block 805, the set cover generator 305 selects the identified most profitable vector packing.

At block 807, the set cover generator 305 removes any unschedulable vector packings from the set of valid vector packing choices. The unschedulable vector packings cannot be scheduled with the already selected set of vector packing choices. The vector packing choices remaining in the set are thus determined to be schedulable with previously selected vector packings in the subset of vector packings. Thus, any vector packing subsequently selected from the valid set (per block 805) is schedulable with previously selected vector packings. In one embodiment, a vector packing is schedulable with the already selected vector packings if it includes operations that are not already represented in the already selected vector packings. For example, in Table 5, if the vector packing in line 6 is already selected, the vector packing in line 7 is not schedulable because a0, a1, a2, and a3 are included in both vector packings. From block 807, the process 609 returns to block 801.

The process 609 thus repeats blocks 801-807 to select the subset of vector packings that determines which operations are vectorized together. At block 801, when no more valid vector packings remain, the process 609 continues to block 611. At block 611, the vector code generator 306 generates the vectorized code 307 based on the selected vector packings.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 200 and/or portions thereof carried on the computer-readable storage medium may be a database or other data structure which can be read by a program and used, directly or indirectly, to fabricate the hardware including the computing system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 200. The netlist may then be placed and routed to produce a data set describing geometric shapes to be applied to masks. The masks may then be used in various semiconductor fabrication steps to produce a semiconductor circuit or circuits corresponding to the computing system 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

The invention claimed is:

1. A computing system, comprising:
a compatibility graph builder configured to generate a compatibility graph based on a dependency graph representing program source code, wherein the compatibility graph indicates compatibility relationships between operations represented in the dependency graph;
a clique generator coupled with the compatibility graph builder and configured to generate a set of candidate vector packings based on the compatibility relationships indicated in the compatibility graph;
a set cover generator coupled with the clique generator and configured to select a subset of vector packings from the set of candidate vector packings based on, for each selected vector packing in the subset of vector packings, determining that the selected vector packing is schedulable with previously selected vector packings in the subset of vector packings; and
a vector code generator coupled with the set cover generator and configured to generate the vector code based on the selected subset of vector packings.

2. The computing system of claim 1, further comprising a dependency graph builder coupled with the compatibility graph builder and configured to:
receive the program source code in a compiler; and
generate the dependency graph based on the program source code, wherein the dependency graph is a dependency directed acyclic graph (DDAG) indicating dependencies between the operations represented in the dependency graph, wherein the operations represented in the dependency graph are derived from the program source code.

3. The computing system of claim 1, wherein the compatibility graph builder is further configured to generate the compatibility graph by:
creating a set of nodes including a node for each operation in the dependency graph; and
recording the compatibility relationships by creating an edge between each pair of the nodes representing operations that are executable together using a single parallel instruction.

4. The computing system of claim 1, wherein the vector code generator is further configured to, for each vector packing representing a memory operation in the selected subset of vector packings:
generate at least one memory instruction in the vector code for accessing a vector register based on the vector packing.

5. The computing system of claim 1, wherein the clique generator is further configured to generate the set of candidate vector packings further by:

generating a first candidate vector packing for a parallel memory access operation by adding to the first candidate vector packing:
  a starting node in the compatibility graph, wherein the starting node represents a memory access operation, and
  subsequent nodes reachable from the starting node in an order of traversing the subsequent nodes from the starting node; and
generating a second candidate vector packing for a parallel non-memory access operation by adding each node of a clique in the compatibility graph to the second candidate vector packing, wherein each node of the clique represents a non-memory access operation.

6. The computing system of claim 1, wherein the set cover generator is further configured to:
  for each selected vector packing in the subset of vector packings, select the selected vector packing from the set of candidate vector packings based on:
    identifying the selected vector packing as a highest profitability vector packing among previously unselected vector packings in the set of candidate vector packings according to a cost model.

7. A method of generating vector code in a compiler, comprising:
  generating a compatibility graph based on a dependency graph representing program source code, wherein the compatibility graph indicates compatibility relationships between operations represented in the dependency graph;
  generating a set of candidate vector packings based on the compatibility relationships indicated in the compatibility graph;
  selecting a subset of vector packings from the set of candidate vector packings based on, for each selected vector packing in the subset of vector packings, determining that the selected vector packing is schedulable with previously selected vector packings in the subset of vector packings; and
  generating the vector code based on the selected subset of vector packings.

8. The method of claim 7, further comprising:
  receiving the program source code in a compiler; and
  generating the dependency graph based on the program source code, wherein the dependency graph is a dependency directed acyclic graph (DDAG) indicating dependencies between the operations represented in the dependency graph, wherein the operations represented in the dependency graph are derived from the program source code.

9. The method of claim 7, wherein generating the compatibility graph further comprises:
  creating a set of nodes including a node for each operation in the dependency graph; and
  recording the compatibility relationships by creating an edge between each pair of the nodes representing operations that are executable together using a single parallel instruction.

10. The method of claim 7, further comprising recording the compatibility relationships by:
  in the compatibility graph, creating an edge between each pair of nodes representing memory operations accessing adjacent memory locations.

11. The method of claim 7, further comprising recording the compatibility relationships by:
  in the compatibility graph, creating an edge between each pair of nodes representing operations of the same type and operating on the same data type.

12. The method of claim 7, further comprising, for each vector packing representing a memory operation in the selected subset of vector packings:
  generating at least one memory instruction for accessing a vector register based on the vector packing.

13. The method of claim 7, wherein generating the set of candidate vector packings further comprises:
  generating a first candidate vector packing for a parallel memory access operation by adding to the first candidate vector packing:
    a starting node in the compatibility graph, wherein the starting node represents a memory access operation, and
    subsequent nodes reachable from the starting node in an order of traversing the subsequent nodes from the starting node; and
  generating a second candidate vector packing for a parallel non-memory access operation by adding each node of a clique in the compatibility graph to the second candidate vector packing, wherein each node of the clique represents a non-memory access operation.

14. The method of claim 13, further comprising:
  determining the clique by performing a Bron-Kerbosch clique generation process based on the compatibility graph.

15. The method of claim 7, further comprising:
  for each selected vector packing in the subset of vector packings, selecting the selected vector packing from the set of candidate vector packings based on:
    identifying the selected vector packing as a highest profitability vector packing among previously unselected vector packings in the set of candidate vector packings according to a cost model.

16. A non-transitory computer-readable storage medium storing instructions for a compiler, wherein the instructions are executable by a processor to:
  generate a compatibility graph based on a dependency graph representing program source code, wherein the compatibility graph indicates compatibility relationships between operations represented in the dependency graph;
  generate a set of candidate vector packings based on the compatibility relationships indicated in the compatibility graph;
  select a subset of vector packings from the set of candidate vector packings based on, for each selected vector packing in the subset of vector packings, determining that the selected vector packing is schedulable with previously selected vector packings in the subset of vector packing; and
  generate the vector code based on the selected subset of vector packings.

17. The non-transitory computer-readable storage medium of claim 16, wherein the instructions are executable by the processor to generate the compatibility graph by:
  creating a set of nodes including a node for each of the operations in the dependency graph; and
  recording the compatibility relationships by creating an edge between each pair of the nodes representing operations that are executable together using a single parallel instruction.

18. The non-transitory computer-readable storage medium of claim 16, wherein the instructions are executable by the processor to record the compatibility relationships by, in the compatibility graph:
creating an edge between each pair of nodes representing memory operations accessing adjacent memory locations; and
creating an edge between each pair of nodes representing operations of the same type and operating on the same data type.

19. The non-transitory computer-readable storage medium of claim 16, wherein the instructions are executable by the processor to generate the set of candidate vector packings by:
generating a first candidate vector packing for a parallel memory access operation by adding to the first candidate vector packing:
a starting node in the compatibility graph, wherein the starting node represents a memory access operation, and
subsequent nodes reachable from the starting node in an order of traversing the subsequent nodes from the starting node; and
generating a second candidate vector packing for a parallel non-memory access operation by adding each node of a clique in the compatibility graph to the second candidate vector packing, wherein each node of the clique represents a non-memory access operation.

20. The non-transitory computer-readable storage medium of claim 16, wherein the instructions are further executable by the processor to:
for each selected vector packing in the subset of vector packings, select the selected vector packing from the set of candidate vector packings based on:
identifying the selected vector packing as a highest profitability vector packing among previously unselected vector packings in the set of candidate vector packings according to a cost model.

\* \* \* \* \*